United States Patent
Takhim (10) Patent No.: US 10,464,853 B2
(45) Date of Patent: Nov. 5, 2019

(54) SOURCE OF PHOSPHATE FOR AGRICULTURE AND THE FOOD INDUSTRY

(71) Applicant: ECOPHOS S.A., Louvain-la-Neuve (BE)

(72) Inventor: Mohamed Takhim, Corroy-le-Grand (BE)

(73) Assignee: ECOPHOS S.A., Louvain-la-Neuve (BE)

(*) Notice: Subject to any disclaimer, the term of this patent is extended or adjusted under 35 U.S.C. 154(b) by 0 days.

(21) Appl. No.: 15/100,836

(22) PCT Filed: Dec. 2, 2014

(86) PCT No.: PCT/EP2014/076250
§ 371 (c)(1),
(2) Date: Jun. 1, 2016

(87) PCT Pub. No.: WO2015/082468
PCT Pub. Date: Jun. 11, 2015

(65) Prior Publication Data
US 2016/0297719 A1    Oct. 13, 2016

(30) Foreign Application Priority Data
Dec. 2, 2013 (BE) .................................. 2013/0806
Dec. 2, 2013 (WO) ................. PCT/EP2013/075251

(51) Int. Cl.
*C05B 11/12* (2006.01)
*C05B 1/04* (2006.01)
(Continued)

(52) U.S. Cl.
CPC .............. *C05B 11/12* (2013.01); *A23L 33/16* (2016.08); *C01B 25/2212* (2013.01);
(Continued)

(58) Field of Classification Search
CPC ... C01B 25/2212; C01B 25/265; C01B 25/28; C01B 25/30; C01B 25/306; C01B 25/32;
(Continued)

(56) References Cited

U.S. PATENT DOCUMENTS 1,851,210 A * 3/1932 Palazzo .................... C05B 1/04
71/33
2,890,934 A    6/1959 Bart
(Continued)

FOREIGN PATENT DOCUMENTS

BE    520114 A    5/1955
CA    1034738 A    2/1975
(Continued)

OTHER PUBLICATIONS

Yamaguchi, Taro, et al. "Decomposition of Phosphate Ore", Chemical Abstracts, Chemical Abstracts Service (CAS), Jun. 30, 1976, No. XP001458479, Abstract, United States.
(Continued)

*Primary Examiner* — Ngoc-Yen Nguyen
(74) *Attorney, Agent, or Firm* — Norris McLaughlin, P.A.

(57) ABSTRACT

A source of phosphate for agriculture and food industry comprises a phosphate salt in solid form of formula $M_n(HPO_4)y \cdot zH_2O$ in which M is Na, K, NH4, n=2, and y=1; or M is Ca, n=1, y=1; or M is Al or Fe, n=2, y=3; and in which z is 0, 1 or 2, wherein said phosphate salt has a phosphate content expressed as a P2O5 content of between 30 and 50% by weight of the phosphate salt, and it has a cadmium content lower than 0.40 ppm.

19 Claims, 1 Drawing Sheet

(51) Int. Cl.
    C05B 7/00      (2006.01)
    C05B 1/02      (2006.01)
    C01B 25/30     (2006.01)
    C01B 25/32     (2006.01)
    C01B 25/26     (2006.01)
    C01B 25/40     (2006.01)
    C01B 25/28     (2006.01)
    C01B 25/37     (2006.01)
    C01B 25/22     (2006.01)
    C01B 25/36     (2006.01)
    A23L 33/16     (2016.01)

(52) U.S. Cl.
    CPC ............ C01B 25/265 (2013.01); C01B 25/28
         (2013.01); C01B 25/30 (2013.01); C01B
         25/306 (2013.01); C01B 25/32 (2013.01);
            C01B 25/324 (2013.01); C01B 25/36
         (2013.01); C01B 25/37 (2013.01); C01B
         25/375 (2013.01); C01B 25/40 (2013.01);
         C05B 1/02 (2013.01); C05B 1/04 (2013.01);
              C05B 7/00 (2013.01); A23V 2002/00
              (2013.01); C01P 2004/61 (2013.01)

(58) Field of Classification Search
    CPC ....... C01B 25/324; C01B 25/36; C01B 25/37;
           C01B 25/375; C01B 25/40; C05B 11/12;
                  C05B 1/02; C05B 1/04; C05B 7/00
    See application file for complete search history.

(56)                    References Cited

U.S. PATENT DOCUMENTS 3,718,453  A  *  2/1973  Thompson ............ C01B 25/301
                                                      423/313
    3,919,395  A     11/1975 Hauge
    3,930,833  A  *  1/1976  Roberts ................. C03C 3/062
                                                      501/45
    3,988,420  A  * 10/1976  Loewy ................... C01B 25/22
                                                      423/157
    4,101,637  A  *  7/1978  Bierman ................. C05B 1/04
                                                      423/309
    2005/0238558 A1  10/2005 Takhim 2007/0122326 A1   5/2007 Takhim
    2008/0267850 A1  10/2008 Takhim
    2011/0200509 A1*  8/2011 Takhim ................. C01B 25/22
                                                      423/319

FOREIGN PATENT DOCUMENTS

CN        1043481 A      7/1990
    FR        1058180 A      3/1954
    FR        2115244 A1     7/1972
    FR        2289443 A2     5/1976
    MX     NL05000002 A      7/2006
    WO       99/02455 A1     1/1999
    WO     2005066070 A1     7/2000
    WO     2004002888 A2     1/2004

OTHER PUBLICATIONS

Yamaguchi, Taro, et al. "Decomposition of Phosphate Ore", Chemical Abstracts, Chemical Abstracts Service (CAS), Jun. 30, 1976, XP001468478, Abstract, United States.
Yamaguchi, Taro, et al. "Decomposition of Phosphate Ore", Chemical Abstracts, Chemical Abstracts Service (CAS), Feb. 28, 1980, XP001468466, Abstract, United States.
Casacuberta, N., et al., "Radioactivity Contents in Dicalcium Phosphate and the Potential Radiological Risk to Human Populations", Journal of Hazardous Materials, May 15, 2009, pp. 814-823, vol. 170, Spain.
International Search Report for corresponding PCT Application No. PCT/EP2014/076250 dated Feb. 11, 2015.
Written Opinion of the International Searching Authority for corresponding PCT Application No. PCT/EP2014/076250 dated Jun. 7, 2016.
Chemical Technology (Inorganic Part), edited by Jiang Jiajun, p. 266-268, Higher Education Press, Apr. 1988.
English Translation Office Action for corresponding Chinese application No. 201480072056.6 dated Dec. 5, 2018.
Bech, et al., "Selenium and other trace element in phosphorites: A comparison between those of the Bayovar-Sechura other provenances", Journal of Goechemical Exploration, vol. 107, pp. 146-160 (2010).
Article from www.emdmillipore.com/salts, "High purity salts Suprapur", EMD Millipore Corporation (2012).

* cited by examiner

SOURCE OF PHOSPHATE FOR AGRICULTURE AND THE FOOD INDUSTRY

This application is a 371 application of PCT/EP2014/076250, filed Dec. 2, 2014, which claims foreign priority benefit under 35 U.S.C. 119 of PCT Application No. PCT/EP2013/075251, filed Dec. 2, 2013, and BE 2013/0806, filed Dec. 2, 2013.

TECHNICAL DOMAIN

This invention relates to a phosphate salt having high purity, that is to say a low content of impurities, particularly radioactive impurities and/or impurities derived from heavy metals or transition metals of the Periodic Table of Elements. This invention also relates to a process for preparing said phosphate salt and its use in a formulation or a composition intended for agriculture or the food industry or for the preparation thereof. Preferably, said phosphate salt can be used for the preparation of single superphosphate (SSP), triple superphosphate (TSP), monoammonium phosphate (MAP), diammonium phosphate (DAP), phosphoric acid, NPK fertilizer, monocalcium phosphate (MCP) or monodicalcium phosphate (MDCP).

TECHNOLOGICAL BACKGROUND OF THE INVENTION

Phosphate salts are regularly used in fertilizer compositions such as fertilizers or food compositions in order to facilitate phosphorus dispersion into the soil or into animal or human food respectively.

In the field of agriculture, fertilizers are nevertheless compounds that can cause serious damage to the environment, particularly cultivated land. Given the intensive use of mineral fertilizers to increase supply of nutrients such as nitrogen or phosphorus, soils can be permanently contaminated if these nutrients contain excessive impurities. Phosphates are a preferred source to supply phosphorus to the soil. These are generally produced or derived from phosphate ore which naturally contains high levels of metals including cadmium, lead, mercury, uranium, chromium or arsenic. The dispersion of these toxic elements in cultivated soils causes sustainable environmental pollution of said cultivated soils. In addition, some of these elements can be found in foods cultivated on these soils, water and ultimately in the human or animal body. Several types of gastrointestinal, pulmonary or renal diseases are known to be caused by the excessive presence of toxic elements.

The phosphate salts commonly used in agriculture include single superphosphate (SSP), triple superphosphate (TSP), or calcium phosphate salts such as dibasic calcium phosphate (DCP).

Dibasic calcium phosphate is prepared from phosphate ore. For example, WO2004/002888 specifies the preparation of phosphate salts by a process comprising the following steps:
  at least one attack on phosphate ore by an aqueous solution of hydrochloric acid, with the formation of an attack liquor,
  a first separation, in the attack liquor, between an insoluble solid phase containing impurities and a separate aqueous phase comprising in solution phosphate ions, chloride ions and calcium ions,
  an extraction of an aqueous solution containing phosphate ions, chloride ions and calcium ions by an organic extraction agent, in order to form an aqueous extraction phase comprising chlorine ions and calcium ions and an organic extraction phase containing phosphoric acid, and
  a re-extraction of the organic extraction phase by an aqueous re-extraction agent, in order to isolate an aqueous re-extraction phase containing phosphate ions, as well as, possibly, a concentration of the aqueous re-extraction phase in order to form an aqueous solution of pure phosphoric acid.

By this process carried out at ambient temperature, dibasic calcium phosphate having a $P_2O_5$ content of 36.27% by weight and a Ca content of 28.9% by weight is obtained. The content of impurities, mainly heavy metals including cadmium, arsenic, nickel or lead is 0.65 ppm, 2.01 ppm, 3.5 ppm and 3.7 ppm, respectively. The use of this salt in fertilizers or animal feed is considered.

WO2005/066070 indicates another method for etching phosphate ore at ambient temperature to form a precipitate of dibasic calcium phosphate. The method includes the following steps:
  a phosphate rock digestion using an aqueous solution of hydrochloric acid, with formation of an attack liquor consisting of an aqueous phase, in which calcium phosphate is in solution, and an insoluble solid phase, containing impurities,
  a first separation between the insoluble solid phase and the aqueous phase of the attack liquor,
  a prior neutralisation of an aqueous medium containing calcium phosphate in solution at a first pH lower than the pH at which a significant part of this calcium phosphate in solution precipitates in the form of calcium monohydrogen phosphate (DCP), with precipitation of impurities,
  an isolation of impurities precipitated from the previously neutralised aqueous medium,
  a subsequent neutralisation of said previously neutralized aqueous medium at a second pH higher than the aforementioned first pH, with precipitation of DCP, and
  a second separation between the subsequently neutralised aqueous medium, which is an aqueous solution of calcium chloride, and precipitated DCP.

The applicant has observed that the precipitated DCP obtained by this method contained a cadmium content of 0.46 ppm.

Similarly, FR2115244 indicates a method for preparation of precipitated DCP produced from an attack of phosphate ore using diluted hydrochloric acid. The insoluble matter derived from this reaction is separated while the liquid phase is subjected to two stages of neutralisation in the presence of a basic compound enabling the precipitation of the DCP. The applicant observed that the heavy metal content in the DCP derived from this method was higher than in the DCP derived from the WO2005/066070 method described above. The cadmium content was 1.3 ppm.

Likewise, Casacuberta et al., Journal of hazardous materials, 2009, 170, 814-823 highlights the contents of radioactive elements in several samples of dibasic calcium phosphate (DCP). The DCP samples 1-4, 9 and 10 mentioned in this document have been prepared by digesting the phosphate ore in the presence of hydrochloric acid and then neutralising the resulting aqueous phase to precipitate the DCP. The contents of $U^{234}$, $U^{238}$ and $Pb^{210}$ are high, respectively of the order of 900 Bq/kg, 1100 Bq/kg and 2000 Bq/kg, i.e. almost 4000 Bq/kg for only three radioactive elements. Casacuberta et al. explain that these high levels of uranium and lead are due to the solubility of these elements in an acid medium and their precipitation in the form of salts concomitantly with the precipitation of the dibasic calcium phosphate during the preparation of the latter. The cadmium content in these samples varies from 0.44 ppm to 6.5 ppm.

Similarly, Taro et al. (Japan Kokai 74/148, 685 and 74/148, 686) highlight the decomposition in acid medium of phosphate ore using a hydrochloric acid solution to prepare tricalcium phosphate. Likewise, Hiroaki et al. describe the production of calcium hydrogen phosphate from phosphate rock (Japan Kokai 78/101959). The rock is treated using a hydrochloric acid solution at 70° C. for 3 hours. In the same way, Raman Gopaliyengar et al. describe the treatment of phosphate rock using a concentrated solution of hydrochloric acid followed by neutralisation with an ammonium salt (Indian 116,950).

Under certain conditions, the magnesium content must also be controlled. The magnesium present in dibasic calcium phosphate (DCP) comes from the source of phosphate used to produce the DCP. Excessively high magnesium content in the phosphate source i.e. greater than 1% by weight of magnesium in the phosphate source creates problems for treatment of the attack liquor during the leaching of the phosphate source with an acid. The phosphate salts are thus generally prepared from a phosphate source with low magnesium content (less than 1% by weight in the phosphate source).

The levels of radioactive elements or metals in phosphate salts such as dibasic calcium phosphate can be reduced to limit the risks of contamination of soils or food grown in these soils while using a wide variety of phosphate sources.

This invention aims at providing a phosphate salt that is suitable for use in a formulation or a composition intended for agriculture or the food industry or adapted to be used for the preparation of a formulation or a composition intended for agriculture or the food industry, and wherein at least a portion of the content of radioactive elements or metallic impurities or heavy metals or transition metals is reduced. This invention also aims at providing a process for preparing said flexible phosphate salt, that is to say a salt that can use a wide range of phosphate sources regardless of the quality thereof.

SUMMARY OF THE INVENTION

According to a first aspect, the present invention relates to a phosphate salt in solid form of formula $M_n(HRO_4)y.zH_2O$ in which M is Na, K, $NH_4$, n=2, and y=1; or M is Ca, n=1, y=1; or M is Al or Fe, n=2, y=3; and in which z is 0, 1 or 2; said phosphate salt has a phosphate content expressed as a P2O5 content of between 30 and 50% by weight of the phosphate salt.

Said phosphate salt of the present invention may have a cadmium content of less than 0.4 ppm. Said phosphate salt of the present invention may have magnesium content lower than or equal to 20 ppm, preferably lower than 15 ppm, and preferably lower than 10 ppm.

Said phosphate salt of the present invention may also have a $Po^{210}$ content of less than 500 Bq/kg, preferably less than 300 Bq/kg, and preferably less than 200 Bq/kg.

Said phosphate salt of the present invention may have a $Ra^{226}$ content of less than 50 Bq/kg, preferably less than 25 Bq/kg, preferably less than 10 Bq/kg, in particular less than 5 Bq/kg.

Preferably, said phosphate salt may have a uranium content of less than 1500 Bq/kg, preferably less than 1000 Bq/kg, and in particular less than 800 Bq/kg. The uranium content is determined by the sum of the respective contents of $U^{234}$, $U^{235}$ and $U^{238}$.

Said phosphate salt may have a $Pb^{210}$ content of less than 1500 Bq/kg, preferably less than 1000 Bq/kg, preferably less than 800 Bq/kg, and in particular less than 500 Bq/kg.

The contents of uranium ($U^{234}$, $U^{235}$ and $U^{238}$), $Pb^{210}$, $Po^{210}$, $Ra^{226}$ or magnesium or cadmium in said phosphate salt according to the invention are significantly reduced compared to equivalent phosphate salts of the prior art. Thus, as mentioned above, Casacuberta et al. described a series of DCP samples obtained by a wet process whose contents of uranium ($U^{234}$ and $U^{238}$), $Po^{210}$, $Pb^{210}$ and magnesium were of the order of 2000 Bq/kg, 1000 Bq/kg, 2000 Bq/kg and 200 ppm, respectively. According to the present invention, said phosphate salt has low contents of radioactive elements for use in agriculture or food and feed. According to the present invention, said phosphate salt may have one or more of the contents of radioactive elements mentioned in this invention in combination with one or more of the metal contents mentioned in it. In addition to low cadmium content, said phosphate salt can have one or more of the contents of $Po^{210}$, $Pb^{210}$, $U^{234}$, $U^{235}$, $U^{238}$, $Ra^{226}$, $Ra^{228}$, $K^{40}$, $Th^{228}$, $Th^{230}$ or $Th^{232}$ mentioned in the present application. The content expressed in relation to a radioactive element, i.e. a radionuclide, corresponds to the activity of the radionuclide in Bq per kg of the product considered, for example per kg of phosphate salt of the invention.

According to a second aspect of the present invention, a method for preparing said phosphate salt is provided. The method involves a wet and non-thermal process (i.e. calcination of the phosphate ore). The method according to the present invention comprises the following steps:

a) a phosphate source digestion using a first aqueous solution of hydrochloric acid, with formation of an attack liquor consisting of an aqueous phase comprising phosphate ions and chloride ions in solution, and a first insoluble solid phase containing impurities, b) a first separation between the aqueous phase comprising phosphate and chloride ions in solution and the first insoluble solid phase containing impurities, c) a neutralisation of said aqueous phase comprising phosphate ions and chloride ions in solution at a pH sufficient to form an aqueous medium comprising chloride ions and to precipitate the phosphate ions in the form of said phosphate salt, d) a second separation between said aqueous medium comprising chloride ions and said phosphate salt, characterized in that steps a) and b) are performed at a temperature between 50° C. and 70° C.

Said phosphate salt has contents of radioactive elements such as uranium, polonium or $Pb^{210}$, and metals such as magnesium or cadmium which are reduced compared to the prior art thanks to the implementation of steps a) and b) of this method at a temperature between 50° C. and 70° C.

Step a) involving the digestion of the phosphate source may last for less than one hour, preferably less than 30 minutes, preferably between 5 minutes and 20 minutes, in particular 15 minutes. The content of radioactive or metallic elements can be also controlled in this relatively short duration of digestion of the phosphate source. By controlling the temperature and/or time taken for digestion of the phosphate source, the quantity of impurities (radioactive or metallic elements) dissolved in step a) is lower while maintaining a rapid and economically viable reaction.

The duration of the neutralisation carried out in step c) may take less than four hours, preferably less than two hours, preferably less than one hour, in particular between 35 minutes and 50 minutes.

Given its purity, i.e. thanks to its low content of radioactive elements, said phosphate salt of the present invention can be used directly as one of the constituents of a composition intended for agriculture or a food composition. Said phosphate salt of the present invention can also be used for the preparation of monoammonium phosphate or diammonium phosphate. Said phosphate salt of the present invention can also be used for the preparation of triple superphosphate or single superphosphate. Said phosphate salt of the present invention can also be used to prepare a phosphoric acid of high purity having low content of radioactive elements. Said phosphate salt of the present invention can also be used to prepare calcium sulphate or calcium chloride preferably having reduced levels of uranium, $Po^{210}$, $Pb^{210}$ and/or cadmium. Said phosphate salt of the present invention can also be used to prepare mono-calcium phosphate or mono-dicalcium phosphate (MDCP).

The present invention also provides compositions comprising said phosphate salt or one of the compounds mentioned above and prepared from said phosphate salt of the present invention.

The method of the present invention also allows us to use a low grade phosphate source, that is to say a source having low phosphate content, expressed as percentage by weight of $P_2O_5$ in the phosphate source, or containing a high impurity content contrary to the method described in the prior art.

DETAILED DESCRIPTION OF THIS INVENTION

According to the present invention, a phosphate salt depleted in metal or radioactive impurities is provided. Said phosphate salt has a phosphate content expressed as $P_2O_5$ content between 30 and 50% by weight of the phosphate salt, preferably 36 to 45% by weight of the phosphate salt. Said phosphate salt may be in solid form.

Said phosphate salt may be of the formula $M_n(HRO_4)y.zH_2O$ wherein
M is Na, K, $NH_4$, n=2, and y=1; or M is Ca, n=1, y=1; or M is Al or Fe, n=2, y=3; and
wherein z is 0, 1 or 2.

Said phosphate salt of the present invention may have a uranium content of less than 1500 Bq/kg, preferably less than 1000 Bq/kg, in particular less than 800 Bq/kg. The uranium content is determined by the respective contents of $U^{234}$, $U^{235}$ and $U^{238}$. Said phosphate salt may have a uranium $U^{234}$ content of less than 800 Bq/kg, preferably less than 600 Bq/kg, preferably less than 500 Bq/kg, in particular less than 400 Bq/kg. Said phosphate salt may have a uranium $U^{238}$ content of less than 900 Bq/kg, preferably less than 700 Bq/kg, preferably less than 500 Bq/kg, in particular less than 400 Bq/kg. Said phosphate salt may have a uranium $U^{235}$ content of less than 100 Bq/kg, preferably less than 75 Bq/kg, preferably less than 50 Bq/kg, in particular less than 20 Bq/kg.

Said phosphate salt of the present invention may have a $Pb^{210}$ content of less than 1500 Bq/kg, preferably less than 1000 Bq/kg, preferably less than 800 Bq/kg, in particular less than 500 Bq/kg.

Said phosphate salt of the present invention may also have a $Po^{210}$ content of less than 500 Bq/kg, preferably less than 300 Bq/kg, preferably less than 200 Bq/kg, in particular less than 150 Bq/kg.

Said phosphate salt of the present invention may have a $Th^{228}$ content of less than 100 Bq/kg, preferably less than 50 Bq/kg, preferably less than 25 Bq/kg, in particular less than 10 Bq/kg. Said phosphate salt of the present invention may have a $Th^{230}$ content of less than 100 Bq/kg, preferably less than 50 Bq/kg, preferably less than 25 Bq/kg, in particular less than 10 Bq/kg. Said phosphate salt of the present invention may have a $Th^{232}$ content of less than 50 Bq/kg, preferably less than 25 Bq/kg, preferably less than 10 Bq/kg, in particular less than 1 Bq/kg. Said phosphate salt of the present invention may have a may have a thorium content, determined by the respective contents of $Th^{230}$, $Th^{228}$ and $Th^{232}$, which is less than 150 Bq/kg, preferably less than 100 Bq/kg, preferably less than 50 Bq/kg, in particular less than 20 Bq/kg.

Said phosphate salt of the present invention may have a $Ra^{226}$ content of less than 50 Bq/kg, preferably less than 25 Bq/kg, preferably less than 10 Bq/kg, in particular less than 5 Bq/kg. Said phosphate salt of the present invention may have a $Ra^{228}$ content of less than 50 Bq/kg, preferably less than 25 Bq/kg, preferably less than 10 Bq/kg, in particular less than 5 Bq/kg and more particularly less than 1 Bq/kg. Said phosphate salt of the present invention may have a may have a radium content, determined by the respective contents of $R^{226}$ and $R^{228}$, which is less than 100 Bq/kg, preferably less than 50 Bq/kg, preferably less than 20 Bq/kg, in particular less than 10 Bq/kg and more particularly less than 5 Bq/kg.

Said phosphate salt of the present invention may have a $K^{40}$ content of less than 25 Bq/kg, preferably less than 10 Bq/kg, preferably less than 5 Bq/kg.

Preferably, said phosphate salt of the present invention is a calcium phosphate salt having the formula $Ca(HP04).zH_2O$ wherein z is 0, 1 or 2; particularly a calcium phosphate salt having the formula $Ca(HP04).2H_2O$. Said calcium phosphate salt can thus have a phosphate content expressed as content of $P_2O_5$ between 30 and 50% by weight of the phosphate salt and calcium content between 15 and 30% by weight of the phosphate salt. Preferably, said calcium phosphate salt can have a phosphate content expressed as content of $P_2O_5$ between 33 and 45% by weight of the phosphate salt and calcium content between 15 and 30% by weight of the phosphate salt. Preferably, said calcium phosphate salt can have a phosphate content expressed as content of $P_2O_5$ between 36 and 45% by weight of the phosphate salt and calcium content between 15 and 30% by weight of the phosphate salt.

In addition to the low contents of radioactive impurities, which include one or more of the radioactive elements detailed above, e.g. $U^{234}$, $U^{235}$, $U^{238}$, $Po^{210}$, $Th^{228}$, $Th^{230}$, $Th^{232}$, $K^{40}$, $Ra^{226}$, $Ra^{228}$ or $Pb^{210}$, said phosphate salt of the present invention can have low levels of metallic impurities, e.g. heavy metals and transition metals. Alternatively or concomitantly with the contents of one or more radioactive elements described in the present application, said phosphate salt can have one or more of the metal contents mentioned below.

In particular, said phosphate salt may have a strontium content less than 300 ppm, preferably less than 280 ppm, preferably less than 250 ppm, particularly less than 100 ppm.

Said phosphate salt may have a barium content less than 50 ppm, preferably less than 25 ppm, preferably less than 10 ppm.

Said phosphate salt may have a cobalt content less than 10 ppm, preferably less than 5 ppm, preferably less than 1 ppm.

Said phosphate salt may have a mercury content less than 10 ppm, preferably less than 5 ppm, preferably less than 1 ppm.

Said phosphate salt may have an arsenic content of less than 5 ppm, preferably less than 3 ppm, preferably less than 1.6 ppm, in particular less than 1 ppm.

Said phosphate salt may have a copper content less than 10 ppm, preferably less than 5 ppm, preferably less than 1 ppm.

Said phosphate salt may have a zinc content of less than 100 ppm, preferably less than 50 ppm, preferably less than 35 ppm.

Said phosphate salt may have a chromium content less than 150 ppm, preferably less than 100 ppm, preferably less than 75 ppm.

Said phosphate salt may have a nickel content of less than 3 ppm, preferably 2.5 ppm.

Said phosphate salt may have a thallium content of less than 5 ppm, preferably less than 2.5 ppm, preferably less than 1 ppm.

Said phosphate salt may have a lead content of less than 3 ppm, preferably less than 2 ppm, preferably less than 1.5 ppm.

Said phosphate salt may have a cadmium content of less than 0.40 ppm, preferably less than 0.30 ppm, preferably less than 0.20 ppm, in particular less than 0.10 ppm.

Said phosphate salt may have a manganese content of less than 20 ppm, preferably less than 15 ppm, preferably less than 10 ppm, in particular less than 5 ppm, more particularly less than 2.8 ppm.

Said phosphate salt may have a molybdenum content of less than 3 ppm, preferably less than 2 ppm, preferably less than 1 ppm.

Said phosphate salt of the present invention may also have a magnesium content lower than or equal to 20 ppm, preferably lower than 15 ppm, preferably lower than 10 ppm. Said phosphate salt may contain less that 5% by weight of the magnesium originally included in said phosphate source, preferably less than 3%, preferably less than 2.5%, in particular less than 1%.

Said phosphate salt of the present invention may optionally have a content of metallic impurities less than 1000 ppm, preferably less than 750 ppm, in particular less than 500 ppm, said content of metal impurities being determined based on the respective contents of barium, cobalt, mercury, manganese, magnesium, molybdenum, strontium, thallium, cadmium, arsenic, copper, lead, zinc, nickel and chromium in said phosphate salt.

Said phosphate salt of the present invention may be in the form of solid particle aggregates having a diameter of between 500 µm and 5 mm, preferably between 500 µm and 3 mm, preferably between 1 mm and 2 mm.

Alternatively, said phosphate salt of the present invention may be in the form of solid particle aggregates having a diameter less than 500 µm, preferably a diameter of between 50 and 500 µm, preferably between 100 µm and 200 µm.

Preferably, said phosphate salt can be produced from a phosphate source selected from a group consisting of the phosphate ore or secondary phosphate sources such as ash, e.g. fly ash (bone ash or slurry, or ash derived from the incineration of sewage sludge) or any other raw material containing more than 10% of phosphate expressed as $P_2O_5$ content (i.e. any other raw material containing 10% by weight of $P_2O_5$). The phosphate ore and secondary phosphate sources typically comprise more than 10% by weight of $P_2O_5$, preferably more than 15% by weight of $P_2O_5$, preferably more than 20% by weight of $P_2O_5$.

Said phosphate salt of the present invention may have water solubility between 0.01 and 2% by weight at room temperature (20° C.). When said phosphate salt is a calcium phosphate salt, it may have a water solubility of between 0.01 and 0.1% by weight at room temperature (20° C.).

Said phosphate salt of the present invention, preferably when it is in the form of a calcium phosphate salt, may be used as an ingredient in a composition intended for agricultural use, in a food composition, or as a starting material for the preparation of phosphoric acid, single or triple superphosphate, mono-calcium phosphate (MCP), mono-dicalcium phosphate (MDCP), ammonium phosphate salts (monoammonium or diammonium), potassium phosphate salts, or NPK fertilizer compounds.

Said phosphate salt of the present invention, preferably when it is in the form of a calcium phosphate salt, may be combined with one or more compounds including water, sulphuric acid, phosphoric acid, a nitrogen source or a potassium source, or mixtures thereof, and be mixed with them to preferably form solid particle aggregates suitable for use as an ingredient in compositions intended for agriculture or food compositions. Said nitrogen source may be ammonia, urea, nitrate, ammonium salt such as ammonium sulphate, ammonium chloride, ammonium nitrate or mixtures thereof, or another source of organic or inorganic nitrogen containing a nitrogen atom. Said potassium source may be a potassium salt such as potassium chloride, potassium sulphate, potassium nitrate, potassium sulphate and a mixture of magnesium sulphate, or mixtures thereof. The solid particle aggregates may include said phosphate salt of the present invention if the reaction with any of the above reactants is not complete. When said phosphate salt is combined with sulphuric acid, and optionally water, single superphosphate (SSP) can be formed. When said phosphate salt is combined with phosphoric acid, and optionally water and sulphuric acid, triple superphosphate (TSP) can be formed. The weight ratio between phosphoric acid and phosphate salt is between 0.5 and 0.65. The phosphate content in the TSP is generally between 40% and 55% by weight of $P_2O_5$. When said phosphate salt is combined with sulphuric acid, said nitrogen source, and optionally water and/or phosphoric acid, monoammonium phosphate (MAP), diammonium phosphate (DAP) or a mixture of both can be formed. When said phosphate salt is combined with sulphuric acid and a potassium source and optionally water and/or phosphoric acid, potassium phosphate salt can be formed. When said phosphate salt is combined with said nitrogen source and said potassium source, and optionally water and/or phosphoric acid and/or sulphuric acid, a "NPK" composition can be formed. The term "NPK" refers to a composition comprising nitrogen, potassium, phosphorus or their mixtures. Preferably, the NPK composition may comprise a different or equal content (by weight) of phosphorus, nitrogen or potassium depending on the total weight of the composition. The content of phosphorus, nitrogen or potassium can be adjusted depending on the compounds combined and their respective proportions. When said phosphate salt is combined with an adequate quantity of phosphoric acid, monocalcium phosphate can be formed. The weight ratio between phosphoric acid and phosphate salt is between 0.5 and 0.65. When said phosphate salt is combined with an adequate quantity of phosphoric acid, mono-dicalcium phosphate can be formed. The weight ratio between phosphoric acid and phosphate salt is less than 0.5. The phosphoric acid used in the various aforementioned methods preferably has a phosphate content expressed in percentage by weight of $P_2O_5$ between 45% and 60%, preferably between 50% and 55%, preferably about 54%.

Said phosphate salt of the present invention can be prepared by the method using the following steps:
a) a phosphate source digestion using a first aqueous solution of hydrochloric acid, with formation of an attack liquor consisting of an aqueous phase comprising phosphate ions and chloride ions in solution, and a first insoluble solid phase containing impurities,
b) a first separation between the aqueous phase comprising phosphate and chloride ions in solution and the first insoluble solid phase containing impurities,
c) a neutralisation of said aqueous phase comprising phosphate ions and chloride ions in solution at a pH sufficient to form an aqueous medium comprising chloride ions and to precipitate the phosphate ions in the form of said phosphate salt,
d) a second separation between said aqueous medium comprising chloride ions and said phosphate salt, characterised in that steps a) and b) are performed at a temperature between 50° C. and 70° C.

Said method of the present invention may also comprise a step of drying said phosphate salt obtained in step d).

Step a) involving the digestion of the phosphate source may last for less than two hours, preferably less than one hour, preferably less than 30 minutes, in particular between 5 and 20 minutes, and more particularly 15 minutes. Decreasing the duration of the digestion step reduces the metal content in the phosphate salt obtained in step b), for example the manganese content.

The duration of the neutralisation carried out in step c) may take less than four hours, preferably less than two hours, preferably less than one hour, in particular between 35 minutes and 50 minutes.

The impurities contained in the solid phase obtained in step a) and separated in step b) may be metal impurities or radioactive elements or insoluble materials. Radioactive elements contained in the solid phase may be one or more of the following elements: $U^{234}$, $U^{235}$, $U^{238}$, $Po^{210}$, $Th^{228}$, $Th^{230}$, $Th^{232}$, $K^{40}$, $Ra^{226}$, $Ra^{228}$ or $Pb^{210}$. The metallic elements can be any of the following metal elements: barium, cobalt, mercury, manganese, magnesium, molybdenum, strontium, thallium, cadmium, arsenic, copper, lead, zinc, nickel and chromium. The implementation of steps a) and b) at a temperature between 50° C. and 70° C., preferably between 55° C. and 65° C., may or may not help control the precipitation of radioactive impurities. Moreover, even in the presence of a phosphate source rich in magnesium, the implementation of the method at a temperature between 50° C. and 70° C. helps control the viscosity of the attack liquor and avoid the processing problems of the leaching reaction of the rock. When steps a) and c) are performed for a short reaction time as mentioned above, the purity of said aqueous medium comprising chloride ions and said phosphate salt obtained in step d) increases. Thus, the presence of radioactive and/or metallic impurities is severely limited in said aqueous medium comprising chloride ions and said phosphate salt obtained in step d) by the method of the present invention.

Said phosphate salt used in step a) can be selected from a group consisting of phosphate ore or secondary phosphate sources such as ash, e.g. fly ash (bone ash or slurry, or ash derived from the incineration of sewage sludge) or any other raw material containing more than 10% of phosphate expressed as a percentage by weight of $P_2O_5$ in said raw material. The ash used herein may comprise more than 10% by weight of phosphate expressed as percentage by weight of $P_2O_5$ in the ash, preferably more than 15% by weight of $P_2O_5$.

Said phosphate source may contain magnesium content higher than 1.5% by weight based on the total weight of the phosphate source. Preferably, the magnesium content of said phosphate source may range from 1.5% to 20% by weight based on the total weight of the phosphate source, preferably between 1.5 and 10% by weight.

Said first aqueous solution of hydrochloric acid used in step a) of this method may have a concentration of HCl that is less than or equal to 15% by weight, preferably 8 to 13% by weight, in particular 10 to 13% by weight, more particularly 12% by weight of the first aqueous solution. The use of an HCl solution less than or equal to 15% helps obtain a filterable attack liquor. The use of a solution having a concentration higher than 20% does not allow filtering of the attack liquor; beyond an HCl concentration higher than or equal to 25%, the attack liquor can no longer be stirred. The use of an HCl solution at a concentration between 8 and 13% by weight or about 12% by weight allows the implementation of step a) in a dilute medium facilitating the processing of the rock rich in magnesium.

Preferably, in the attack liquor, the molar ratio between HCl and Ca is between 1.2 and 2.6, preferably between 1.6 and 2.4, preferably between 1.6 and 2.2, in particular between 1.6 and 2.0.

Said neutralisation in step c) may be performed in the presence of a base, preferably calcium carbonate, calcium hydroxide, calcium oxide or one or more calcium salts, sodium salts, potassium salts or ammonium salts. Preferably, said neutralisation in step c) is performed in the presence of calcium carbonate, calcium hydroxide, calcium oxide or a calcium salt. In this case, said precipitated phosphate salt is a calcium phosphate salt and said aqueous medium in step d) comprises chloride ions and calcium ions. Said aqueous medium is preferably a calcium chloride solution having calcium chloride content between 8 and 20% by weight of the solution, preferably between 12 and 18% by weight, preferably about 15% by weight.

Alternatively, the use in step c) of a sodium salt, potassium salt or ammonium salt allows the preparation of a sodium phosphate salt, potassium phosphate salt or ammonium phosphate salt respectively. Proper use of a salt or an aluminium or iron hydroxide allows the preparation of the corresponding phosphate salt.

Said neutralisation performed in step c) may be carried out at a pH below 5, preferably between 2.0 and 5.0, preferably between 2.5 and 4.0, in particular between 2.5 and 3.0. When the neutralisation is performed at a pH between 2.5 and 3.0, the magnesium remains in solution without precipitating concomitantly with said phosphate salt. Preferably, this neutralisation step may be performed at room temperature or at a temperature between 50 and 70° C.

Said phosphate salt obtained in step d) may contain less than 5% by weight of the magnesium originally contained in said phosphate source, preferably less than 2.5%, preferably less than 1%, in particular less than 1%.

According to a preferred form of embodiment, step a) of this method can be performed in a first co-current reactor comprising one or more compartments, preferably 2 to 12 compartments, preferably between 2 and 5 compartments, in particular between 3 and 5 compartments. The compartments are arranged in series and are connected to each other by the lower part. The rock and hydrochloric acid may for example be introduced into a first compartment. The attack liquor thus formed then passes through each of the other compartments that can be thus used to modulate or control the reaction time, and optimise the mixing of the compounds. The last compartment of said first reactor co-current to step a) is connected to a filter via a conduit for carrying the reaction mixture obtained at the end of step a) to the filter wherein step b) of this method will be performed. Optionally, a buffer storage tank may be placed between the last compartment of the first co-current reactor used for the implementation of step a) and the filter used for the implementation of step b). In this case, the reaction mixture obtained at the end of step a) is transferred from the buffer tank to the filter of step b). The filtrate recovered in step b) is transferred to a second co-current reactor comprising one or more compartments, preferably 2 to 12 compartments, preferably between 2 and 5 compartments, in particular from 3 to 5 compartments. The neutralisation in step c) of the present method is performed in said second co-current reactor. The filtrate is first introduced into the first compartment of said second reactor. The flow of the filtrate is used to transfer the latter to the other compartments of said second co-current reactor. When the neutralisation is performed in the presence of a base, the latter may be introduced into each of the compartments of said second reactor when the filtrate flows to each of them. The neutralisation reaction continues in each of the compartments in said second reactor to facilitate the precipitation of the phosphate salt of the present invention. The use of this compartmentalised reactor for the implementation of step c) of this method allows the formation of crystals of said phosphate salt of the present invention having an optimised shape and size for the subsequent step d).

Thus, when said phosphate salt is DCP having the formula $CaHPO_4.2H_2O$, the DCP crystals obtained may be in the form of a cluster, that is to say, spherical or elliptical agglomerates. The largest size of the agglomerates may be less than 500 µm, preferably between 20 µm and 250 µm.

According to a particular form of embodiment, the method of the present invention further comprises the following steps:
  e) an attack of all or part of said phosphate salt obtained in step d) using an aqueous solution of strong acid to form a suspension of first phosphoric acid in solution and a second solid phase,
  f) a third separation between the first phosphoric acid and said second solid phase.

Preferably, step e) can be performed at a temperature greater than 80° C., especially at a temperature between 80° C. and 100° C. The implementation of step e) at a temperature higher than 80° C., preferably at a temperature between 80° C. and 100° C., helps control the viscosity of the reaction medium obtained in step e). Preferably, when said phosphate salt used in step e) is a calcium phosphate salt, said aqueous solution of strong acid may be sulphuric acid. Thus, the second solid phase of step e) comprises calcium sulphate hemihydrate. Alternatively, when said phosphate salt used in step e) is a calcium phosphate salt and step e) is performed at a temperature below 80° C., preferably between 60° C. and 80° C., said aqueous solution of strong acid may be sulphuric acid and said second solid phase of step e) comprises calcium sulphate dihydrate.

Preferably, in step e) the molar ratio of the aqueous solution of strong acid and said phosphate salt obtained in step d) may be between 0.6 and 1.6.

The first phosphoric acid obtained in step f) may be treated with activated carbon or a sulphide compound or can be concentrated. Said first phosphoric acid can be used in a composition intended for agriculture, for example a fertilizer composition, or used in the preparation of a food composition. Said first phosphoric acid can be used for the preparation of a triple superphosphate or superphosphoric acid. The content of radioactive or metallic elements in the products thus prepared will be reduced.

According to a preferred form of embodiment, said aqueous medium comprising chloride ions and obtained in step d) may be treated with a basic compound to form a purified aqueous phase and a solid phase comprising impurities. Said purified aqueous phase comprises chloride ions and preferably has a pH of between 8 and 12, preferably between 9 and 10.

Preferably, when the aqueous medium obtained in step d) comprises chloride ions and calcium ions, the basic compound is selected from calcium hydroxide, calcium oxide and calcium salt, sodium salt, potassium salt or ammonium salt to form a purified aqueous phase comprising calcium chloride. Said solid phase comprising impurities may include magnesium salts or radioactive elements or metallic impurities. The treatment of said aqueous medium containing chloride ions and obtained in step d) using a basic compound thus allows us to obtain a purified solution of calcium chloride, i.e. a solution having contents of radioactive elements and magnesium. This treatment may be performed at a temperature between 50 and 70° C. Alternatively, this treatment may be performed at room temperature. Preferably, said purified aqueous phase has a calcium chloride content of between 10 and 30% by weight of the purified aqueous phase, preferably between 12 and 20% by weight, preferably about 15%.

Thus, the present invention also concerns calcium chloride depleted in radioactive elements. Calcium chloride may be in solution or in solid form. Said calcium chloride may have a uranium content of less than 1 Bq/kg, preferably less than 0.1 Bq/kg, the uranium content being determined by the respective contents of $U^{234}$, $U^{235}$ and $U^{238}$. Said calcium chloride may also have a $Po^{210}$ content of less than 500 Bq/kg, preferably less than 250 Bq/kg, preferably less than 100 Bq/kg. Said calcium chloride may also have radium content, determined by the respective contents of $R^{226}$ and $R^{228}$, which is less than 10 Bq/kg, preferably less than 1 Bq/kg, preferably less than 0.5 Bq/kg. Said calcium chloride may also have a $Pb^{210}$ content of less than 100 Bq/kg, preferably less than 50 Bq/kg. Said calcium chloride may also have thorium content, determined by the respective contents $Th^{228}$, $Th^{230}$ and $Th^{232}$, which is less than 10 Bq/kg, preferably less than 1 Bq/kg. Said calcium chloride can be obtained by the method of the present invention, for example using steps a) to d) of the present method wherein step c) is performed in the presence of a calcium salt, calcium oxide or hydroxide to obtain in step d) an aqueous medium comprising chloride ions and calcium ions, thereby forming an aqueous medium comprising calcium chloride. This aqueous mixture comprising of calcium chloride may be dried or concentrated.

Preferably, said aqueous medium comprising calcium chloride, and obtained in step d) may be purified for presenting even lower contents of different radioactive elements or metals. Thus, said calcium chloride may have a uranium content of less than 0.05 Bq/kg, the uranium content being determined by the respective contents of $U^{234}$, $U^{235}$ and $U^{238}$. Said calcium chloride may also have a $Po^{210}$ content of less than 50 Bq/kg, preferably less than 10 Bq/kg, preferably less than 5 Bq/kg. Said calcium chloride may also have radium content, determined by the respective contents of $R^{226}$ and $R^{228}$, which is less than 1 Bq/kg, preferably less than 0.5 Bq/kg, preferably less than 0.1 Bq/kg. Said calcium chloride may also have a $Pb^{210}$ content of less than 10 Bq/kg. Said calcium chloride may also have thorium content, determined by the respective contents $Th^{228}$, $Th^{230}$ and $Th^{232}$, which is less than 0.1 Bq/kg; preferably no thorium trace is detected. Preferably, said purified calcium chloride may be prepared using the present method by treating the calcium chloride solution obtained above with a basic compound, for example selected from calcium hydroxide, calcium oxide and calcium salt, sodium salt, potassium salt or ammonium salt as described in the present application. The purified calcium chloride solution thus obtained may have a pH greater than 10. Said purified calcium chloride solution may be concentrated and/or dried. Thus, a calcium chloride solution having a $CaCl_2$) concentration of 35-40% by weight of the total solution can be obtained. Alternatively, granules of $CaCl_2$ having a $CaCl_2$ content of over 95% by weight based on the total weight of the granules can be obtained. Alternatively, petals of $CaCl_2$ having a $CaCl_2$ content higher than 70% by weight based on the total weight of the petals can be obtained, preferably a content between 70 and 80% by weight.

The second solid phase of step e) and separated one of step f) comprises calcium sulphate hemihydrate or calcium sulphate dihydrate or a mixture of both. The calcium sulphate hemihydrate, calcium sulphate dihydrate or a mixture thereof may be mixed with an acid solution, preferably a strong acid solution, to form a solid phase comprising calcium sulphate dihydrate and an aqueous phase comprising phosphate ions. The calcium sulphate hemihydrate is thus transformed into calcium sulphate dihydrate. The acid solution may be a hydrochloric acid solution, and thus the aqueous phase obtained is a hydrochloric acid solution also containing phosphate ions. Alternatively, the solution of strong acid may be a sulphuric acid solution and the second solid phase separated in step f) may also be mixed with said purified aqueous phase, preferably said purified calcium chloride solution, or with said aqueous medium comprising chloride ions obtained in step d), preferably with said aqueous medium comprising chloride ions and calcium ions obtained in step d), or their mixture.

A solid phase comprising calcium sulphate dihydrate and an aqueous phase comprising of hydrochloric acid are then obtained. The aqueous phase comprising hydrochloric acid can be recycled to form all or part of said first aqueous solution of hydrochloric acid used in step a).

Thus, the present invention allows the preparation of calcium sulphate dihydrate with at content of radioactive elements. Said calcium sulphate thus prepared may have a $K^{40}$ content of less than 50 Bq/kg, preferably less than 30 Bq/kg, preferably less than 16 Bq/kg. Said calcium sulphate may have a $Ra^{228}$ content of less than 50 Bq/kg, preferably less than 25 Bq/kg, preferably less than 10 Bq/kg, in particular less than 5 Bq/kg. Said calcium sulphate may have a $Ra^{226}$ content of less than 50 Bq/kg, preferably less than 25 Bq/kg, preferably less than 10 Bq/kg, in particular less than 5 Bq/kg. Said calcium sulphate may have a $Th^{228}$ content of less than 50 Bq/kg, preferably less than 25 Bq/kg, preferably less than 10 Bq/kg, in particular less than 5 Bq/kg. Said calcium sulphate may have a $U^{235}$ content of less than 50 Bq/kg, preferably less than 25 Bq/kg, preferably less than 10 Bq/kg, in particular less than 5 Bq/kg. Said calcium sulphate may have a $U^{238}$ content of less than 50 Bq/kg, preferably less than 25 Bq/kg, and preferably less than 15 Bq/kg.

According to a third aspect of the present invention, said phosphate salt of the present invention can be used, preferably in solid form, in a composition or for the preparation thereof. The composition may be a composition intended for agricultural use or a food composition. Preferably, said composition intended for agricultural use is a liquid fertilizer composition or a fertilizer composition partially or fully soluble in water. Said food composition is intended used for animal or livestock feed or human food. Preferably, said used phosphate salt is prepared using the method of the present invention.

According to a fourth aspect of the present invention, a composition intended for agriculture or a food composition comprising the phosphate salt of the present invention is provided.

Said food composition may also comprise a basic food material. Said food composition may be prepared by a method comprising the following steps:
  A) preparation of said phosphate salt of the present invention using the method of the present invention,
  B) mixing of said phosphate salt thus prepared with a basic food material.

The composition intended for agriculture may also comprise a potassium source and/or a source of nitrogen, diammonium phosphate, monoammonium phosphate, potassium phosphate, single superphosphate, monocalcium phosphate, mono-dicalcium phosphate or triple superphosphate. Said composition intended for agricultural use can be fertilizer composition, preferably a liquid fertilizer composition, or a fertilizer composition partially or fully soluble in water. Said nitrogen source may be ammonia, urea, nitrate, ammonium salt such as ammonium sulphate, ammonium chloride, ammonium nitrate or mixtures thereof, or another source of organic or inorganic nitrogen containing a nitrogen atom. Said potassium source is a potassium salt such as potassium chloride, potassium sulphate, potassium nitrate, potassium hydrogen sulphate, mixture of potassium sulphate and magnesium sulphate, or mixtures thereof. Said composition intended for agriculture can be prepared by a process comprising the following steps:
  A) preparation of said phosphate salt of the present invention, preferably using the method of the present invention,
  B) mixing of said phosphate salt obtained in A) with one or more of the following compounds: a source of nitrogen or a source of potassium or a mixture thereof, water, sulphuric acid or phosphoric acid to form said composition.

In the various compositions described in the present application, said phosphate salt of the present invention is preferably a calcium phosphate salt ($CaHPO_4 \cdot zH_2O$ where z is 0, 1 or 2; preferably z is 2).

According to a particular form of embodiment of the invention, a method for the preparation of single superphosphate (SSP) is provided and comprises the following steps:
  A) preparation of said phosphate salt of the present invention, preferably using the method of the present invention,
  B) addition of sulphuric acid, and optionally phosphoric acid, and water to said phosphate salt to form single superphosphate (SSP).

The molar ratio between the sulphuric acid and said phosphate salt is between 0.1 and 1. The molar ratio between the phosphoric acid and said phosphate salt is between 0 and 1.

According to a particular form of embodiment of the invention, a method for the preparation of triple superphosphate (TSP) is provided and comprises the following steps:
- A) preparation of said phosphate salt of the present invention, preferably using the method of the present invention,
- B) addition of phosphoric acid, and optionally sulphuric acid, and/or water to said phosphate salt to form TSP.

The molar ratio between sulphuric acid and said phosphate salt is between 0 and 1, preferably between 0.1 and 0.5. The molar ratio between phosphoric acid and said phosphate salt is between 0.1 and 1, preferably between 0.1 and 0.5.

According to a particular form of embodiment of the invention, a method for the preparation of monoammonium phosphate (MAP) or diammonium phosphate (DAP) is provided and comprises the following steps:
- A) preparation of a phosphate salt of the present invention, preferably using the method of the present invention,
- B) addition of sulphuric acid and ammonia or an ammonium salt to said phosphate salt to form monoammonium phosphate or diammonium phosphate.

Preferably, the addition of sulphuric acid may be prior to that of the ammonia or ammonium salt. Preferably, a filtration is performed after the addition of sulphuric acid to separate an aqueous phase comprising phosphoric acid and a solid phase comprising calcium sulphate. The ammonia or ammonium salt is added to the filtrate derived from said filtration,
1. i.e. to the aqueous phase comprising phosphoric acid. The molar ratio between sulphuric acid and said phosphate salt is between 0.5 and 1.5, preferably between 0.8 and 1.2. Preferably, the molar ratio between ammonia or ammonium salt and said phosphate salt is between 0.5 and 2.5.

According to a particular form of embodiment of the invention, a method for the preparation of potassium phosphate is provided and comprises the following steps:
- A) preparation of a phosphate salt of the present invention, preferably using the method of the present invention,
- B) addition of a potassium source to said phosphate salt, and optionally an acid, to form said potassium phosphate salt.

The acid can be phosphoric acid or sulphuric acid. Preferably, when sulphuric acid is added, this addition may be prior to that of the potassium source. Preferably, a filtration is performed after the addition of sulphuric acid to separate an aqueous phase comprising phosphoric acid and a solid phase comprising calcium sulphate. The potassium source can then be added to the filtrate derived from said filtration, i.e. to the aqueous phase comprising phosphoric acid. Alternatively, filtration can be performed after the implementation of step b). The molar ratio between sulphuric acid and said phosphate salt is between 0.5 and 1.5, preferably between 0.8 and 1.2. Preferably, the molar ratio between the potassium source and said phosphate salt is between 0.5 and 2.5, preferably between 1 and 2. The process is particularly applicable to the preparation of monopotassium phosphate (MKP—$KH_2PO_4$). In this case, the potassium source may preferably be potassium chloride, potassium sulphate, potassium hydrogen sulphate ($KHSO_4$) or another potassium salt. The molar ratio between the acid and said phosphate salt is between 0 and 1. The molar ratio between the potassium source and said phosphate salt is between 0.5 and 2.5, preferably between 1 and 2. The addition of acid is optional when the potassium source is potassium hydrogen sulphate.

Said phosphate salt of the present invention, when prepared preferably according to the method of the present invention, can be used in a composition intended for agriculture or in a food composition, or used as a starting material for the preparation of said compositions. These can be prepared using the methods described above. The present invention also allows the preparation of an "NPK" composition. This type of composition is frequently used as fertilizer in agriculture. The present invention therefore provides compositions having low levels of impurities (radioactive elements or metals) preventing contamination of soils and crops in which these compositions may be used.

According to a particular form of embodiment of the invention, a method for the preparation of NPK composition is provided and comprises the following steps:
- A) preparation of a phosphate salt of the present invention, preferably using the method of the present invention,
- B) addition of sulphuric acid, a nitrogen source and/or a source of potassium to said phosphate salt to form an NPK composition.

The molar ratio between the sulphuric acid and said phosphate salt is between 0.1 and 1.5.

According to a particular form of embodiment of the invention, a method for the preparation of monocalcium phosphate (MCP) is provided and comprises the following steps:
- A) preparation of a phosphate salt of the present invention, preferably using the method of the present invention,
- B) addition of a suitable amount of phosphoric acid to obtain a monocalcium phosphate.

The appropriate amount of phosphoric acid is determined according to the weight of the phosphate salt. The weight ratio between phosphoric acid and phosphate salt is between 0.5 and 0.65.

According to a particular form of embodiment of the invention, a method for the preparation of mono-dicalcium phosphate (MDCP) is provided and comprises the following steps:
- A) preparation of a phosphate salt of the present invention, preferably using the method of the present invention,
- B) addition of a suitable amount of phosphoric acid to obtain mono-dicalcium phosphate.

The appropriate amount of phosphoric acid is determined according to the weight of the phosphate salt. The weight ratio between phosphoric acid and phosphate salt is less than 0.5.

Preferably, the method of the invention is performed continuously.

Figure 1:
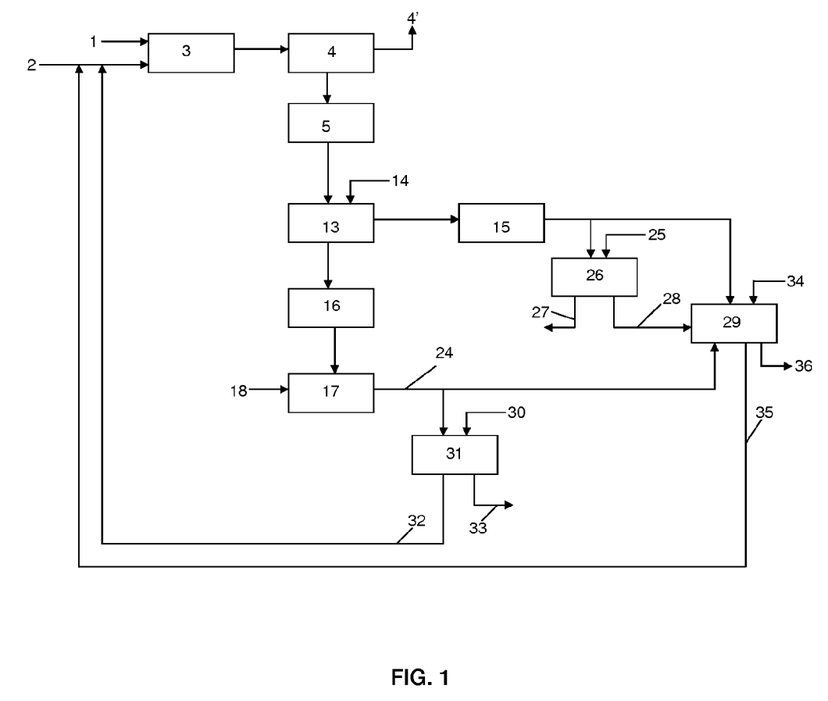
FIG. 1 shows a block diagram of the method for the preparation of said phosphate salt according to a particular form of embodiment of the present invention.

FIG. 1 shows a block diagram of the method for the preparation of said phosphate salt according to a particular form of embodiment of the present invention. The particular form embodiment described below relates in particular to the preparation of dibasic calcium phosphate having low content of radioactive elements, as well as to the preparation of calcium chloride solutions or calcium sulphate also having low content of radioactive elements. The method may apply to the preparation of other types of phosphate salts, e.g., sodium phosphate salt, potassium phosphate salt, ammonium phosphate salt, aluminium phosphate salt or iron phosphate salt.

The phosphate source 1, for example phosphate ore, is treated with a hydrochloric acid solution 2 during a step involving the digestion of the phosphate source in 3. The treatment is performed at a temperature between 50 and 70° C. for a duration of less than one hour, preferably less than 30 minutes, preferably between 5 minutes and 20 minutes.

The reaction medium 4 derived from the digestion 3 comprises a solid phase containing impurities (radioactive elements and/or metal impurities) and a liquid phase comprising phosphate and chloride ions. The reaction medium 4 is filtered to separate the solid phase 4' comprising the metallic impurities and/or radioactive elements from the aqueous phase 5 comprising phosphate and chloride ions.

The aqueous phase 5 comprising phosphate and chlorides ions is then treated, in 13, with a base 14, for example $CaCO_3$, to form a precipitate of dibasic calcium phosphate 16 and an aqueous solution 15 comprising chloride ions and calcium ions thereby forming a calcium chloride solution. The precipitate of dibasic calcium phosphate 16 and the aqueous solution 15 are separated by filtration, for example using a band filter. The dibasic calcium phosphate 16 thus obtained is a phosphate salt of the present invention, i.e. with reduced radioactive elements. This dibasic calcium phosphate 16 can be used as raw material in a composition intended for agriculture or in a food composition. It can also be used as the starting reactant for the preparation of compounds such as single or triple superphosphate, monoammonium phosphate or diammonium phosphate, or potassium phosphate, monocalcium phosphate (MCP) or monodicalcium phosphate (MDCP).

Dicalcium phosphate 16 may also be treated, preferably at a temperature higher than 80° C., using a sulphuric acid solution 18 in 17 to form a solid phase comprising calcium sulphate and an aqueous phase comprising phosphoric acid, subsequently separated from one another for example by filtration. The calcium sulfate thus obtained 24 comprises calcium sulfate hemihydrate, which may be treated in 31 using a hydrochloric acid solution 30. After separation, an aqueous hydrochloric acid solution 32 and a solid phase of calcium sulfate dihydrate 33 are obtained. The solid phase of calcium sulfate dihydrate 33 has low contents of radioactive or metallic elements. The calcium sulphate dihydrate 33 can thus be used in a paper bleaching process or in the preparation of plaster or compositions intended for use in the construction industry. The aqueous hydrochloric acid solution 32 also comprises residual phosphate ions.

The calcium chloride solution 15 can be purified in 26 by adding a base 25, for example calcium hydroxide. After separation, for example by filtration, a solid phase 27 comprising impurities and a purified aqueous phase comprising calcium chloride 28 are obtained. The purified aqueous phase comprising calcium chloride 28 may be concentrated and/or dried to obtain calcium chloride in various forms (solid or solution) at different concentrations. The purified aqueous phase comprising calcium chloride 28 may also be treated in 29 by a sulphuric acid solution 34. The calcium chloride solution 15 and calcium sulphate solution 24 may also be added in 29 to form an aqueous phase of hydrochloric acid 35 and a solid phase comprising calcium sulphate dihydrate 36. The hydrochloric acid solution 35, like the hydrochloric acid solution 32, can be recycled for use in 3 in the step involving the digestion of the phosphate source. The solid phase comprising calcium sulphate dihydrate 36 can be used as calcium sulphate dihydrate 33.

In addition to a phosphate salt with reduced content of radioactive elements, the present method allows the preparation of calcium chloride, in solution or in solid form, and/or calcium sulphate dihydrate each having low contents of radioactive elements. The preparation of these compounds and their subsequent use is another advantage of the present invention.

According to an alternative aspect of the invention, when said phosphate source used in step a) of this method is a secondary phosphate source such as fly ash derived from the incineration of bones, slurry or sludge purification as described in this application, the digestion using a hydrochloric acid solution (step a)) forms an aqueous solution comprising phosphate ions and chloride ions in solution. It can be isolated after step b) of the method. This solution is purified to remove the chloride ions to produce phosphoric acid or MCP. The chloride ions can be removed using the purification techniques known to those skilled in the art.

EXAMPLES

Procedure for Determining the Contents of Radioactive Elements by Gamma Ray Spectroscopy The contents of $Pb^{210}$, $K^{40}$, $R^{226}$ and $R^{228}$ have been determined by gamma ray spectroscopy. The measurements have been performed using a detector comprising a high-purity germanium (HPGe) from the brand Canberra (HPGe XtRa with 50% relative efficiency or HPGe BEGe with 34% relative efficiency) and placed within a measuring device containing a lead shielding. The measurements are performed between 3 keV and 3 MeV for a BEGe detector or between 3 keV and >10 MeV for an XtRa detector. The detector is calibrated using samples placed in Marinelli™ containers with a capacity of 1 mL to 2.5 L. The contents of $Ra^{226}$ have been determined by measuring "daughter" radionuclides of $Ra^{226}$. The sample to be analysed is combined with activated carbon in water to absorb the $Ra^{226}$ present in the sample. The solid residue is placed in a container (coaxial HDPE—250 mL) for 21 days. The measurement of $Ra^{226}$ has been performed using a Lucas cell detector. The content of $K^{40}$ is determined by the emission line at 1460.82 keV. The $Ra^{226}$ content was determined based on the "daughter" radionuclides $Bi^{214}$ and $Pb^{214}$ whose emission lines are respectively located at 609.31 keV, 1120.28 keV and 1764.5 keV for $Bi^{214}$ and at 241.99 keV, 295.22 keV and 351.93 keV for $Pb^{214}$. The $Ra^{228}$ content was determined by considering the emission lines of $Ac^{228}$ at 338.32 keV, 911.19 keV and 968.96 keV. The $Pb^{210}$ content was determined by considering the emission line at 46.5 keV.

Procedure for Determining the Contents of Radioactive Elements by Alpha-Particle Spectrometry The contents of $Po^{210}$, $Th^{228}$, $Th^{230}$, $Th^{232}$, $U^{234}$, $U^{235}$, $U^{238}$ were determined by alpha-particle spectrometry. The detector is a silicon detector also referred to as a "PIPS detector" from Canberra. When the sample to be analysed is solid (e.g. DCP or $CaSO_4$), 1 g of the sample is previously digested using microwaves in the presence of a mixture comprising 5 ml of hydrofluoric acid, 5 mL of hydrochloric acid and 5 mL of nitric acid. When the sample to be analysed is liquid, it (10 mL) is treated with an aqueous solution of $FeCl_3$ (1 mL of a solution prepared from 7.3 g/100 mL). The precipitate is centrifuged and calcined. To determine the content of polonium $Po^{210}$, the pre-treated sample mentioned above is mixed with 0.25 L of water and 20 mL of hydrochloric acid (6 M), ascorbic acid before being placed on a silver surface and stirred at a temperature between 80° C. and 90° C. for 6 hours. To determine the contents of uranium and thorium, the sample is purified on an ion-exchange resin (Biorad AG) in the presence of a tracer ($Po^{208}$ and $Po^{209}$) for removing polonium and subjected to a second separation between uranium and thorium on a column consisting of a UTEVA® resin (Eichrom) in the presence of a $U^{232}$ and $Th^{229}$ tracer.

Procedure for Determining the Contents of Transition Metals

The metal content in a sample is determined by optical emission spectroscopy (ICP-OES: Inductively coupled plasma optical emission spectrometry) using an Agilent 710 Axial ICP Optical Emission Spectrometer equipped with a nebulizer (One Neb insert concentric ICP) and a plasma torch (lo-flw, Quartz, inlet tbg, axial). The samples and standards are prepared in containers previously cleaned with a dilute solution of nitric acid (193 g of nitric acid at 96%, diluted to 1000 mL with distilled water).

The apparatus is calibrated by the following procedure using a standard $Pb(NO_3)_2$ solution with a lead concentration of 100 mg/L, $Cd(NO_3)_2$ solution with a cadmium concentration of 100 mg/L, $Hg(NO_3)_2$ solution with a mercury concentration of 100 mg/L, $H_3AsO_4$ solution with an arsenic concentration of 100 mg/L, and $Y(NO_3)_3$ solution with a yttrium concentration of 100 mg/L. From each of the $Pb(NO_3)_2$, $Cd(NO_3)_2$, $Hg(NO_3)_2$ and $H_3AsO_4$ solutions, a series of 7 calibration samples at 0.01 ppm, 0.05 ppm, 0.1 ppm, 0.5 ppm, 1 ppm and 5 ppm are prepared. In each sample, 200 µL of the standard solution of $Y(NO_3)_3$ is added and each sample is diluted with the diluted solution of nitric acid mentioned above to reach a volume of 100 mL.

Preparation of $CaCl_2$ samples to be analysed using the ICP-OES: In a 100 mL flask containing 50 mL of the diluted nitric acid solution as prepared above, 10 g of $CaCl_2$ and 200 µL of the standard solution $Y(NO_3)_3$ are added. The volume is then adjusted to 100 mL by adding the diluted nitric acid solution. The solution thus obtained is agitated vigorously.

Preparation of Samples of Phosphate Salt of the Present Invention, DCP, and Gypsum to be Analysed Using the ICP-OES In a 100 mL flask containing 25 mL of the diluted nitric acid solution as prepared above, 2 g of the sample to be analysed and 10 ml of hydrochloric acid (37%) solution are added. If necessary, the resulting solution can be boiled to dissolve the sample. 200 µL of the standard solution of $Y(NO_3)_3$ is added and the volume is adjusted to 100 mL by adding the diluted nitric acid solution. The resulting solution is vigorously agitated and may be filtered before analysing it, if necessary.

Example 1

Phosphate ore from North Africa with a $P_2O_5$ content of 29% by weight is used. The attack of the ore is performed using an aqueous solution having HCl content by weight of 12% at a temperature of 60° C. The quantity of HCl added is determined by a molar ratio of the HCl added to the ore and the Ca present in it. The attack of the ore is performed at an HCl/Ca ratio of 1.8. The residence time in the attack reactor is 15 minutes. The attack liquor is then transferred to a filter press where the insoluble materials (referred to as residue in Table 1 below) are separated from the aqueous phase. The temperature is maintained at 60° C. for filtration. The solution exiting the filter press is transferred to a neutralisation reactor. Calcium carbonate is added at a Ca/P molar ratio of 1 and a pH of 2.5-3.0. After 45 minutes of reaction and formation of dibasic calcium phosphate (DCP), the neutralised reaction medium is then directed to a band filter. The resulting cake is dried and consists of DCP with the characteristics mentioned below, i.e. low content of radioactive elements and/or low metallic content. The DCP has a $P_2O_5$ content of 44% by weight (dry weight) and a calcium content of 24% by weight (dry weight). The filtrate is an aqueous solution of calcium chloride at 15% by weight.

The calcium chloride solution may be purified by adding calcium hydroxide until the pH of the solution is between 9 and 10. Insoluble material mainly consisting of magnesium salts and radioactive elements precipitate, thus reducing the content of radioactive elements in the calcium chloride solution. A purified calcium chloride solution (15% by weight) is thus obtained.

Table 1 details the contents of radioactive elements in the ore, the dibasic calcium phosphate (DCP) obtained, the calcium chloride solution ($CaCl_2$) and the purified calcium chloride solution ($CaCl_2p$) and residue from the filtration after the digestion of the ore (that is to say the first solid phase). Example 1 was repeated three times and the various aforementioned compounds were analysed every time. For each radioactive element, an average value of the three tests was determined and is given below in Table 1.

TABLE 1

Content of radioactive elements (Bq/kg) in the rock, DCP, $CaCl_2$, $CaCl_2p$ and the residue from the attack liquor using the method of the present invention.

| | Ore | DCP | Residue | $CaCl_2$ | $CaCl_2p$ |
|---|---|---|---|---|---|
| $Po^{210}$ | 607 | 120 | 1360 | 50 | 2 |
| $Th^{228}$ | 54 | 6 | 225 | 0 | 0 |
| $Th^{230}$ | 613 | 8 | 2620 | 0 | 0 |
| $Th^{232}$ | 52 | 0 | 223 | 0 | 0 |
| $U^{234}$ | 593 | 387 | 1283 | 0.03 | 0.015 |
| $U^{235}$ | 26 | 15 | 61 | 0 | 0 |
| $U^{238}$ | 583 | 340 | 1377 | 0.03 | 0.009 |
| $K^{40}$ | 31 | 4 | 52 | 1 | 0 |
| $Ra^{226}$ | 572 | 2 | 2127 | 0.38 | 0 |
| $Ra^{228}$ | 51 | 0 | 188 | 0 | 0 |
| $Pb^{210}$ | 570 | 275 | 63 | 31 | 8 |

(0 = content of the element considered below the detection limit)

The results in Table 1 unambiguously demonstrate that the method of the present invention allows the preparation of a phosphate salt with reduced levels of radioactive elements, i.e. a lower concentration of radionuclides. Most of the radioactive elements are precipitated in the insoluble materials derived from the filtration of the attack liquor. The implementation of the ore digestion step at a temperature between 50 and 70° C., for example 60° C., makes it possible to facilitate the precipitation of radioactive elements. Thus, in addition to the dibasic calcium phosphate, calcium chloride, which may or may not be purified, with low concentrations of radionuclides, i.e. radioactive elements, is also obtained. The contents of radioactive elements in the dibasic calcium phosphate obtained using the invention are lower than the contents specified for different DCP samples by Casacuberta et al. (Journal of hazardous materials, 2009, 170, 814-823). The phosphate salt of the present invention is thus purer than the DCP of the prior art, when the content of radioactive elements is counted. In addition, the cadmium content in the DCP obtained according to the present invention was 0.26 ppm.

Example 2 (Comparative)

Example 1 is repeated by performing ore digestion and filtration of the attack liquor at room temperature. The contents of radioactive elements are significantly higher than those obtained in the dibasic calcium phosphate of the present invention, i.e. when steps a) and b) of this method of the invention are performed at a temperature between 50° C. and 70° C. The uranium content was higher than 1500 Bq/kg. In particular, the content of $K^{40}$, $Ra^{228}$, $Th^{232}$, $Pb^{210}$ and $U^{234}$ in the DCP in the DCP obtained from Example 2 was respectively 9 Bq/kg, 580 Bq/kg, 72 Bq/kg, 1170 Bq/kg and 900 Bq/kg. The polonium $Po^{210}$ content was 840 10 Bq/kg.

Example 3

Example 1 is repeated using Syrian ore containing a $P_2O_5$ content of 30.9%. Dibasic calcium phosphate having a $P_2O_5$ content of 42% by weight and calcium content of 27% by weight is obtained. The dibasic calcium phosphate obtained in Example 3 has the same characteristics, in terms of levels of radioactive elements, as the dibasic calcium phosphate of Example 1. Table 2 below details the metallic content in the dibasic calcium phosphate obtained from Example 3. The table also details the metallic contents of a dibasic calcium phosphate described in WO2004/002888 produced by a comparative method wherein the steps involving the digestion and filtration of the attack liquor are performed at room temperature.

TABLE 2

Metallic content (in ppm) in the dibasic calcium phosphate of Example 3 and in the dibasic calcium phosphate of WO2004/002888

|    | DCP (Ex. 3 - Invention) | DCP (comparative |
|----|-------------------------|------------------|
| As | 1.5                     | 2.01             |
| Ba | 3.5                     | n.d.             |
| Cd | 0.096                   | 0.65             |
| Co | 0.94                    | n.d.             |
| Cr | 66                      | 73               |
| Cu | 3.8                     | 1.3              |
| Hg | <0.1                    | n.d.             |
| Mg | 20                      | 23.5             |
| Mn | 3                       | n.d.             |
| Mo | 0.83                    | n.d.             |
| Ni | 2.2                     | 3.5              |
| Pb | 1.3                     | 3.7              |
| Sr | 240                     | n.d.             |
| Tl | <0.05                   | n.d.             |
| Zn | 34                      | 36               |

The method of the present invention allows us to produce a phosphate salt such as dibasic calcium phosphate wherein the metal content is reduced. The contents of cadmium, arsenic and lead are strongly reduced in the dibasic calcium phosphate prepared using the present invention. The magnesium content in the DCP is less than 1% of the magnesium originally present in the phosphate ore.

Example 4—Preparation of Single Superphosphate (SSP)

The dibasic calcium phosphate prepared in Example 1 can be used for the preparation of single superphosphate. The dibasic calcium phosphate was mixed with a sulphuric acid solution (0.5 molar equivalent relative to the quantity of dibasic calcium phosphate) in a double propeller mixer (operation in opposite direction). The single superphosphate $(Ca(H_2PO_4)2)$ obtained with a $P_2O_5$ content between 32 and 37% by weight is dried and sieved. The single superphosphate can be used as such as a fertilizer in a composition intended for agricultural use. The quantity of sulphuric acid may be adapted to form, in the presence of a bulking agent, single superphosphate having a $P_2O_5$ content between 16 to 18%.

Example 5—Preparation of Triple Superphosphate (TSP)

The dibasic calcium phosphate prepared in Example 1 can be used for the preparation of triple superphosphate. The dibasic calcium phosphate was mixed with a solution of sulphuric acid (0.33 molar equivalent relative to the quantity of dibasic calcium phosphate) and phosphoric acid (0.33 molar equivalent relative to the quantity of dibasic calcium phosphate) in a double propeller mixer (operation in opposite direction).

Triple superphosphate $(Ca(H_2PO_4)_2)$ obtained with a $P_2O_5$ content of 45% by weight is dried and then sieved. The triple superphosphate thus obtained can be used as such as a fertilizer in a composition intended for agricultural use.

Example 6—Preparation of Monoammonium Phosphate and Diammonium Phosphate (MAP/DAP)

The dibasic calcium phosphate prepared in Example 1 can be used for the preparation of monoammonium phosphate and diammonium phosphate. The dibasic calcium phosphate is mixed with a solution of sulphuric acid (1 molar equivalent relative to the quantity of dibasic calcium phosphate) to form phosphoric acid in solution and a precipitate of calcium sulphate. After filtration, ammonia (between 1 and 2 molar equivalents relative to the quantity of dibasic calcium phosphate) is added to the phosphoric acid solution. The proportion of the monoammonium phosphate and diammonium phosphate may vary depending on the quantity of ammonia added. After drying and granulation, the monoammonium phosphate and diammonium phosphate are used as such as fertilizers in a composition intended for agricultural use.

Example 7—Preparation of an NPK Composition

The dibasic calcium phosphate prepared in Example 1 can be used for the preparation of an NPK composition. The dibasic calcium phosphate is mixed with a solution of sulphuric acid (1 molar equivalent relative to the quantity of dibasic calcium phosphate) and then with ammonia and potassium chloride. The quantities of ammonia and potassium chloride added are determined depending on the contents of nitrogen and potassium desired in the final NPK composition. NPK compositions 15/15/15, 10/10/10, 10/5/10 and 20/20/20 have been prepared. The phosphorus and potassium values represent the quantity of oxides in the form of $P_2O_5$ or $K_2O$ which would have been present in the composition if the entire elemental phosphorus or potassium had been oxidised in these forms. The nitrogen value is that of elemental nitrogen by weight in the composition.

Example 8

Example 1 was repeated using a phosphate rock comprising 2.3% of magnesium by weight. The dibasic calcium phosphate obtained had the same characteristics as those of the dibasic calcium phosphate of Example 1 in terms of contents of radioactive elements and cadmium. In addition, less than 0.7% by weight of the magnesium present in the phosphate rock was initially present in this dibasic calcium phosphate.

Example 9

The purified calcium chloride solution $(CaCl_2p)$ obtained in Example 1 is treated with a sulphuric acid solution (96% by weight) to form gypsum dihydrate $CaSO_4$, $2H_2O$ and a solution of hydrochloric acid. The gypsum dihydrate $CaSO_4$, $2H_2O$ is analysed and the contents of metals and radioactive elements are shown below in Table 3. The gypsum dihydrate $CaSO_4$, $2H_2O$ comprises a CaO content of 32.7% by weight and a $SO_3$ content of 46.4% by weight.

TABLE 3

| Contents (in ppm) of metals and radioactive elements (Bq/kg) in the gypsum dihydrate $CaSO_4$, $2H_2O$ from Example 9 | |
|---|---|
| Magnesium (ppm) | 20 |
| Strontium (ppm) | 600 |
| Total $P_2O_5$, (% by weight) | 0.042 |
| $K^{40}$ (Bq/kq) | <16 |
| $Ra^{228}$ (Bq/kq) | <4 |
| $Ra^{226}$ (Bq/kq) | <2.2 |
| $Th^{228}$ (Bq/kq) | <1.7 |
| $U^{235}$ (Bq/kq) | <1.2 |
| $U^{238}$ (Bq/kq) | <13 |

The method of the present invention allows the preparation of gypsum having very low content of radioactive elements.

Example 10

Example 1 is repeated using ash derived from the calcination of sludge as a source of phosphate. The phosphate content in the phosphate source is 23.6% by weight of $P_2O_5$ of the phosphate source. The phosphate salt obtained is dibasic calcium phosphate comprising a phosphate content of 33.1% by weight of $P_2O_5$ and 15% by weight of calcium in the dibasic calcium phosphate. The contents of cadmium, chromium and mercury in the DCP obtained are respectively 0.28 ppm, 50 ppm and less than 0.1 ppm. The contents of radioactive elements are similar to those obtained for the DCP obtained in Example 1.

The invention claimed is:

1. A method comprising:
   a) digesting a phosphate source using a first aqueous solution of hydrochloric acid to form an attack liquor consisting of an aqueous phase comprising phosphate ions and chloride ions in solution, and a first insoluble solid phase containing impurities,
   b) separating the aqueous phase comprising phosphate and chloride ions in solution from the first insoluble solid phase containing impurities,
   c) neutralizing said aqueous phase comprising phosphate ions and chloride ions in solution at a pH sufficient to form an aqueous medium comprising chloride ions and to precipitate the phosphate ions in the form of a phosphate salt,
   d) separating said aqueous medium comprising chloride ions from said phosphate salt,
   wherein a) and b) are performed at a temperature between 50° C. and 70° C. for a duration less than two hours and wherein said first aqueous solution of hydrochloric acid has an HCl concentration of 12-15% by weight, and further wherein the neutralization carried out in c) takes less than one hour.

2. The method according to claim 1, wherein:
   a) lasts for less than one hour.

3. The method according to claim 1, wherein:
   said phosphate source contains magnesium content higher than 1.5% by weight based on the total weight of the phosphate source, or
   said phosphate source of a) is selected from a phosphate ore or secondary phosphate sources containing more than 10% of phosphate expressed as content of $P_2O_5$ by weight in the phosphate source.

4. The method according to claim 1, wherein:
   in the attack liquor, the molar ratio between HCl and Ca is between 1.2 and 2.6.

5. The method according to claim 1, wherein said neutralization of c) is performed in the presence of at least one selected from: (i) calcium carbonate, calcium hydroxide, calcium oxide, one or more calcium salts, sodium salts or ammonium salts; (ii) calcium carbonate, calcium hydroxide, calcium oxide or a calcium salt soluble in water; said precipitated phosphate salt is a calcium phosphate salt and said aqueous medium contains chloride ions and calcium ions; (iii) calcium carbonate, calcium hydroxide, calcium oxide or a calcium salt soluble in water; said precipitated phosphate salt is a calcium phosphate salt and said aqueous medium is a calcium chloride solution having a calcium chloride content between 8 and 20% by weight of the solution; and (iv) calcium carbonate, calcium hydroxide, calcium oxide or a calcium salt soluble in water; said precipitated phosphate salt is a calcium phosphate salt and said aqueous medium contains chloride ions and calcium ions forming a solution of calcium chloride; and wherein a basic compound selected from calcium hydroxide, calcium oxide, calcium salts, sodium salts, potassium salts or ammonium salt is added to said calcium chloride solution until a pH of said calcium chloride solution is between 8 and 12, and a solid phase comprising impurities in the form of magnesium salts is formed.

6. The method according to claim 1, wherein:
   in c), the pH is below 5, and/or
   a basic compound is added to said aqueous medium comprising chloride ions obtained in d) to form a purified aqueous phase comprising chloride ions and of pH between 8 and 12, and a solid phase comprising impurities.

7. The method according to claim 1, wherein the method further comprises:
   e) attacking all or part of said phosphate salt obtained in d) using an aqueous solution of strong acid to form a suspension of first phosphoric acid in solution and a second solid phase,
   f) performing a third separation between the first phosphoric acid and said second solid phase.

8. The method according to claim 7, wherein, in e), the molar ratio of the aqueous solution of strong acid and said phosphate salt obtained in d) is between 0.6 and 1.6.

9. The method according to claim 7, wherein the aqueous solution of strong acid used in e) is an aqueous solution of sulphuric acid and the second solid phase formed in e) comprises calcium sulphate hemihydrate, calcium sulphate dihydrate or a mixture thereof, wherein addition of the sulphuric acid, and optionally water, to said phosphate salt to form phosphoric acid is done with a molar ratio of 0.9 to 1.1 between sulphuric acid and said phosphate salt.

10. The method according to claim 7, wherein the second solid phase, obtained in f) and comprising calcium sulphate hemihydrate, calcium sulphate dihydrate or a mixture thereof, is mixed with an acid solution, such that the calcium sulphate hemihydrate is transformed into calcium sulphate dihydrate, to form a solid phase comprising calcium sulphate dihydrate and an acidic aqueous phase comprising phosphate ions.

11. The method according to claim 1, wherein the phosphate salt obtained in step d), in solid form, is of the formula $M_n(HPO_4)y.zH_2O$, wherein M is Na, K, $NH_4$, n=2, and y=1; or M is Ca, n=1, y=1; or M is Al or Fe, n=2, y=3; and wherein z is 0, 1 or 2; said phosphate salt has a phosphate content expressed as a $P_2O_5$ content of between 30 and 50% by weight of the phosphate salt, wherein the cadmium content in said phosphate salt is less than 0.40 ppm.

12. The method according to claim 11, wherein the phosphate salt further comprises:
   the $Ra^{226}$ content is less than 100 Bq/kg,
   the magnesium content is less than or equal to 20 ppm,
   the uranium content in said phosphate salt is less than 1500 Bq/kg, the uranium content being determined by the respective contents of $U^{234}$, $U^{235}$ and $U^{238}$,
   the $Pb^{210}$ content in said phosphate salt is less than 1500 Bq/kg, and/or
   the content of polonium $Po^{210}$ in said phosphate salt is less than 300 Bq/kg.

13. The method according to claim 11, wherein the phosphate salt is a calcium phosphate salt having a calcium content of between 15 and 30% by weight.

14. The method according to claim 11, wherein the phosphate salt is in the form of solid particle aggregates having a diameter of between 500 μm and 5 mm or a diameter less than 500 μm.

15. The method according to claim 11, wherein said phosphate salt has one or more of the following contents of metallic impurities: the strontium content is less than 280 ppm or the nickel content is less than 3 ppm or the thallium content is less than 5 ppm or the lead content is less than 3 ppm or a manganese content of less than 15 ppm or a molybdenum content of less than 3 ppm.

16. A method for preparing a composition, the method comprising:
   A) preparing the phosphate salt according to the method of claim 11,
   B) mixing, to prepare the composition, the phosphate salt obtained in A) with
   a basic food material, or
   a potassium source and/or a nitrogen source.

17. A preparation method comprising:
   A) preparing of the phosphate salt according to the method of claim 11; and
   B) a step chosen from:
   (i) adding sulphuric acid, and optionally phosphoric acid, water, to said phosphate salt obtained in A) to form a single superphosphate;
   (ii) adding sulphuric acid and ammonia or an ammonium salt to said phosphate salt obtained in A) to form monoammonium phosphate or diammonium phosphate;
   (iii) adding sulphuric acid, a nitrogen source or a potassium source, or both, to said phosphate salt obtained in A) to form a composition comprising nitrogen, potassium, phosphorus or mixtures thereof;
   (iv) adding phosphoric acid, and optionally sulphuric acid, water, to said phosphate salt obtained in A) to form triple superphosphate; or
   (v) adding a potassium source to said phosphate salt obtained in A), and optionally an acid, to form a potassium phosphate salt.

18. A method of preparing monocalcium phosphate and mono-di-calcium phosphate, the method comprising:
   A) preparing the phosphate salt according to the method of claim 11,
   B) adding phosphoric acid to said phosphate salt obtained in A) to form at least monocalcium phosphate or mono-di-calcium phosphate, wherein:
   a weight ratio between phosphoric acid and said phosphate salt between 0.5 and 0.65 for the preparation of the monocalcium phosphate; or
   a weight ratio between phosphoric acid and said phosphate salt less than 0.5 for the preparation of the mono-di-calcium phosphate.

19. The method according to claim 1, wherein the neutralization carried out in c) takes between 35 and 50 minutes.

\* \* \* \* \*